United States Patent [19]

Garda

[11] Patent Number: 4,664,633

[45] Date of Patent: May 12, 1987

[54] NON-COMPUTER LEARNING AID

[76] Inventor: Aboobaker Garda, 116 Abbeywood Trail, Don Mills, Ontario, Canada, M3B 3B6

[21] Appl. No.: 835,177

[22] Filed: Mar. 3, 1986

[51] Int. Cl.$^4$ .............................................. G09B 11/04
[52] U.S. Cl. ...................................... 434/164; 33/564
[58] Field of Search ................ 434/162, 163, 164, 167

[56] References Cited

U.S. PATENT DOCUMENTS

| | | | |
|---|---|---|---|
| 2,068,497 | 1/1937 | Lorber | 434/164 |
| 2,850,811 | 9/1958 | Boley | 434/164 |
| 3,683,516 | 8/1972 | Fass | 434/164 |
| 3,818,615 | 6/1974 | Jimenez | 434/164 |

FOREIGN PATENT DOCUMENTS

2460145  2/1981  France ................................ 434/164

Primary Examiner—William H. Grieb
Attorney, Agent, or Firm—Sim and McBurney

[57] ABSTRACT

A stencil case and a plurality of cards are provided for use with the stencil case. The stencil case has a front panel and can receive a card such that the card lies adjacently behind the panel. The panel has a first surface region containing a window through which a user can view the adjacently lying part of a card, a second surface region containing a stencil, and a third surface region bearing indicia associated with what is seen through the window when any one of the plurality of cards is received adjacently behind the panel. Each card has a front face and a reverse face, the front face having a first region containing a picture or indicia that will be visible through the window when the card lies adjacently behind the front panel. Each card further contains a second region for receiving a stencilled marking through the stencil of the front panel. The combination is intended to be used as an educational aid.

25 Claims, 9 Drawing Figures

NON-COMPUTER LEARNING AID

This invention relates generally to educational toys, and has to do particularly with an educational toy that can be used to assist in teaching a child reading, writing and arithmetical skills, as well as coordination skills.

GENERAL DESCRIPTION OF THIS INVENTION

Young children between the ages of 3 and 8 often have vocabularies which are reasonably well developed, but it is frequently the case that a child in this age bracket has not been taught to read and write.

It is an object of an aspect of this invention to provide an educational toy which is easy to use with minimal assistance, and which can be utilized to develop the aforementioned skills in a child.

More particularly, this invention provides, in combination:
a stencil case and a plurality of cards for use with said stencil case,
the stencil case having a front panel and means for receiving a card such that the card lies adjacently behind said panel, the panel having a first surface region containing a window through which a user can view the adjacently lying part of a card, a second surface region containing a stencil, and a third surface region bearing indicia associated with that which is seen through said window when any one of said plurality of cards is received adjacently behind said panel,
each of said plurality of cards having a front face and a reverse face, the front face having a first region containing a picture or indicia that will be visible through said window when the card lies adjacently behind said front panel, and a second region for receiving a stencilled marking through the stencil of the front panel.

In another aspect, this invention provides, in combination:
a stencil case, a plurality of cards for use with said stencil case and a holder for the cards, the stencil case being substantially rectangular, each card being substantially rectangular with a first dimension substantially the same as a dimension of the stencil case and a second dimension substantially greater than the other dimension of the stencil case,
the holder being adapted to hold and retain a card, the stencil case having a front panel and being adapted to be placed such that a card held in said holder lies adjacently behind the front panel, the panel having a first surface region containing a window through which a user can view the adjacently lying part of a card, a second surface region containing a stencil, and a third surface region bearing indicia associated with the stencil in the front panel,
each of said plurality of cards having a plurality of coloured areas spaced along said second dimension of the card, and having a region adjacent each such coloured area for receiving a stencilled marking.

GENERAL DESCRIPTION OF THE DRAWINGS

Three embodiments of this invention are illustrated in the accompanying drawings, in which like numerals denote like parts throughout the several views, and in which.

DETAILED DESCRIPTION OF THE DRAWINGS

Figure 2:
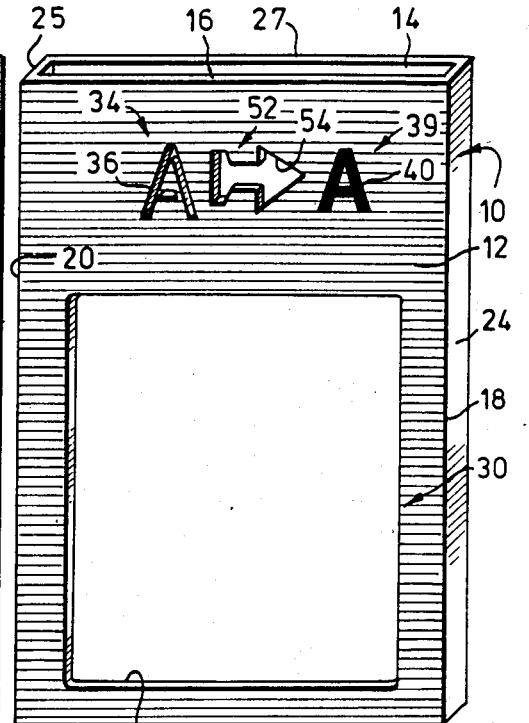
FIG. 2 is a perspective view of a stencil case for use with the first embodiment of this invention.

Attention is first directed to FIG. 2, which shows a stencil case 10 for use with the first embodiment of this invention. The stencil case has a front panel 12 and means for receiving a card such that the card lies adjacently behind the panel 12. The stencil case 12 is substantially rectangular in configuration and has a top edge 16, two side edges 18 and 20, and a bottom edge 22. The slot 14 is located in the top edge 16 and is defined by virtue of two narrow side walls 24 and 25 and a back panel 27 which is parallel to but spaced from the front panel 12. The front panel 12 has a first surface region 30 containing a window 32 through which a user can view the adjacently lying part of a card (shortly to be described), a second surface region 34 containing a stencil 36, and a third surface region 39 bearing indicia 40, in this case the capital letter A, which is associated with that which is seen through the window 32 when a card is received adjently behind the front panel 12.

Figure 1:
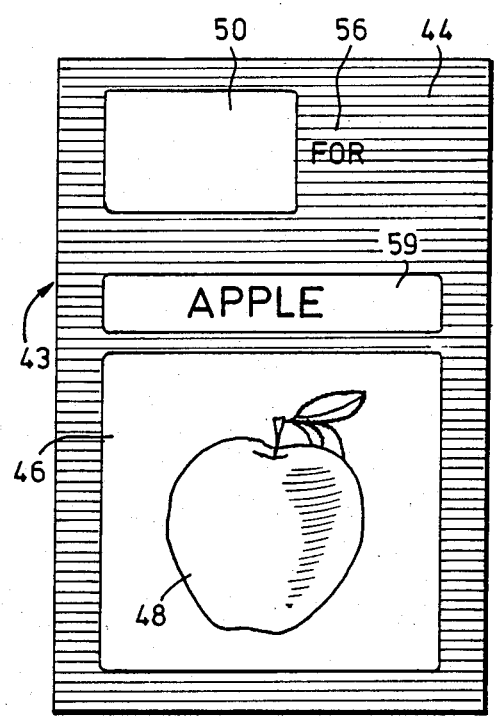
FIG. 1 is a face view of a card for use with the first embodiment of this invention.

Turning to FIG. 1, it will be seen that a card 43 for use with the stencil case shown in FIG. 2 has a front face 44 and a reverse face (not seen in FIG. 1), the front face 44 having a first region 46 containing a picture 48 or other indicia that will be visible through the window 32 of the stencil case 10 when the card 43 lies adjacently behind the front panel 12 of the stencil case 10. The card 43 further contains a second region 50 for receiving a stencilled marking through the stencil 36 of the front panel 12 of the stencil case 10.

Returning to FIG. 2, the front panel 12 of the stencil case 10 has a fourth region 52 containing a further window 54 through which the corresponding part of an adjacently lying card can be seen by the user, the card 43 (see FIG. 1) having on its front face 44 a third region 56 containing a colour matching a coloured region on the front panel 12, the third region 56 of the card showing through the further window 54 when the card 43 is located adjacently behind the front panel 12, thereby to allow the user to be assured that the card he is using is the correct card for the stencil case.

In a preferred embodiment, the entire front face 44 of the card 43, with the exception of the rectangular second region 50, the rectangular first region 46, and an additional rectangular region 59 which in this embodiment contains the word "APPLE", will be of a single colour, and the entire front panel 12 of the stencil case 10 will be the same colour, with the indicia 40 printed, embossed or otherwise marked thereon. This will mean that the colour showing through the window 54, which in the FIG. 2 embodiment is in the shape of an arrow, will be the same colour as the rest of the front panel 12. The user can thus determine, by the identity of the colours, that the card he is using is the correct card.

It is to be appreciated that, although FIGS. 1 and 2 show only a single stencil case 10 and a single card 43, the invention is carried out by providing a plurality of stencil cases similar to the case 10, but all of a different colour, and by further providing a number of pluralities of cards 43, the cards of each plurality being of the same colour, and matching one of the stencil cases. Thus, each stencil case will have a different letter at the stencil 36: A, B, C, etc., and all of the cards in the plurality intended to be used with a given stencil case will contain representations of articles which begin with the letter of that stencil case. For example, the stencil case containing the stencil A may be coloured red, as an example. There would be provided a number of pluralities of cards, one of the pluralities having all of its cards coloured red except for the rectangular regions mentioned earlier. The cards in the "red" plurality would contain representations of an apple, an axe, an ant, and so forth.

Figure 3:
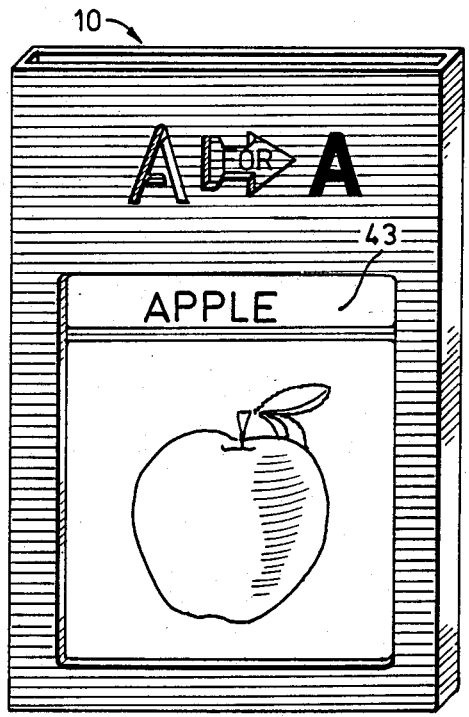
FIG. 3 is a view of the stencil case of FIG. 2, with the card of FIG. 1 inserted.
Figure 4:
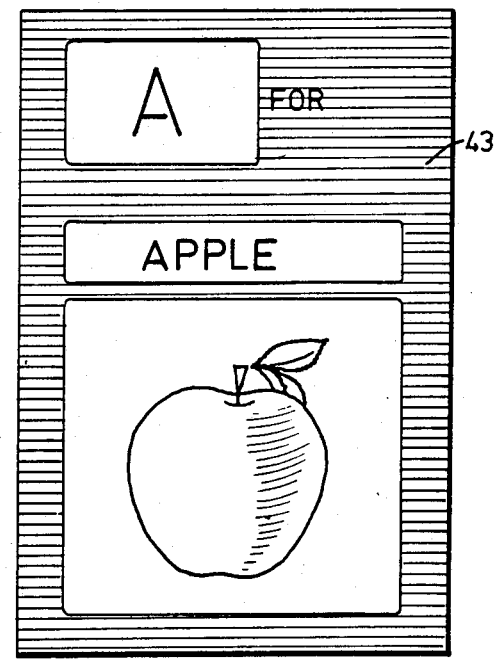
FIG. 4 is a face view of the card of FIG. 1, after the stencil has been applied.

FIG. 3 shows the stencil case 10 with the card 43 inserted, and FIG. 4 shows the card 43 after the stencil has been applied, and after it has been removed from the stencil case 10.

Before moving on to describe the second embodiment of this invention shown in FIGS. 5–8, it is appropriate to point out that, in the first embodiment shown in FIGS. 1-4, the first-mentioned window 32 is located in the lower part of the front panel 12, the stencil 36 is located at upper left of the front panel 12, the further window 54 is located at upper middle of the front panel 12, and the third surface region 39 is located at right of the front panel.

Figure 6:
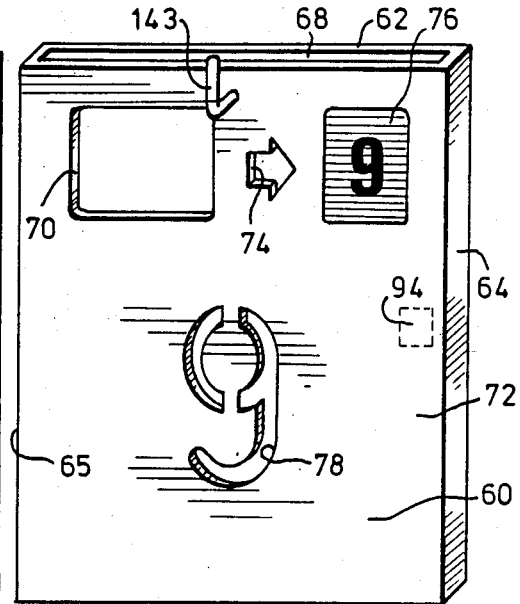
FIG. 6 is a perspective view of a stencil case for use with the second embodiment of this invention.

By contrast, FIG. 6 shows a stencil case 60 which again has the same general configuration, with a top edge 62, two side edges 64 and 65, and a bottom edge 66, as well as a slot 68 provided in the same manner as for the stencil case 10 shown in FIG. 2. However, the stencil case 60 shown in FIG. 6 has a rectangular window 70 at upper left of a front panel 72 thereof, and has a further window 74 located at upper middle of the front panel 72. A region 76 is provided at upper right of the front panel 72, corresponding to the third region 39 on the stencil case 10 of FIG. 2. In contrast to the case 10 shown at FIG. 2, however, the case 60 contains a stencil 78 in the lower central part of the panel 72.

In the embodiment shown in FIGS. 5–8, the indicia in the region 76 is a numeral, for example the numeral 9 shown in FIG. 6. The stencil 78 is also of the same numeral.

Figure 5:
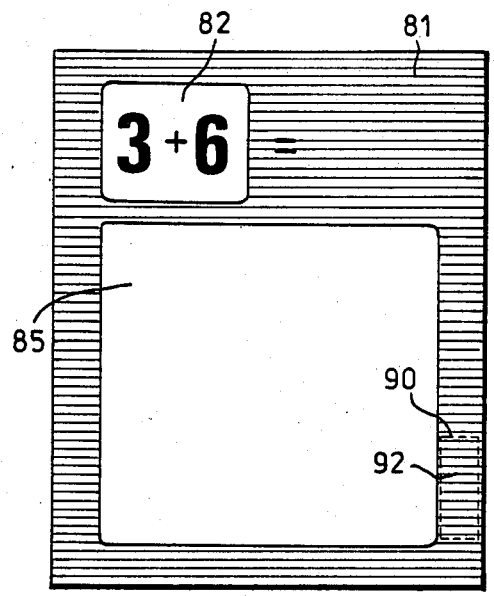
FIG. 5 is a face view of a card for use with a second embodiment of this invention.

FIG. 5 shows a card 81, being one of a plurality of cards for use with the particular stencil case 60 shown in FIG. 6. The card 81 contains at the upper left a region 82 containing a mathematical problem for which the answer is the numeral 9 showing in the region 76 of the stencil case 60. In the example, the mathematical problem is to solve 3+6. Again in the example shown in FIG. 5, the "equals" symbol appears just to the right of but outside of the rectangular region 82 that contains the mathematical problem. The "equals" sign is positioned in such a way as to show through the further window 74 of the stencil case 60.

Figure 7:
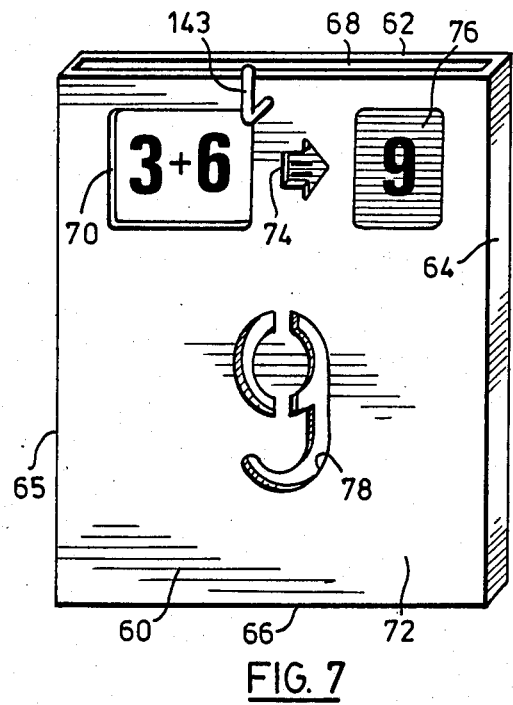
FIG. 7 is a view of the stencil case of FIG. 6, with the card of FIG. 5 inserted.
Figure 8:
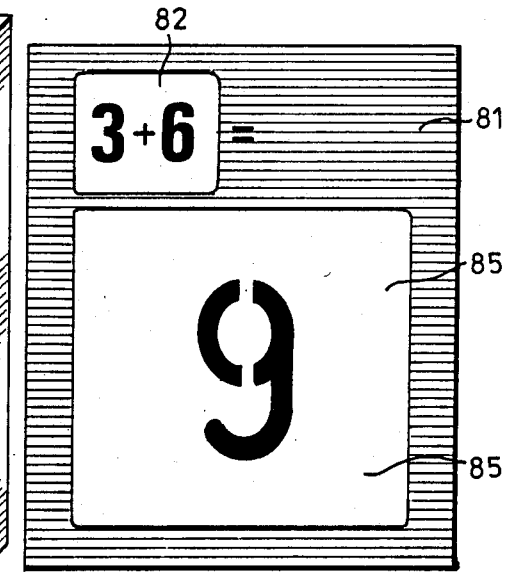
FIG. 8 is a face view of a card of FIG. 5, after the stencil has been applied.

Thus, when the card 81 is inserted into the stencil case 60, the result is shown in FIG. 7, in which it can be seen that the entire mathematical problem appears solved at the top of the stencil case, i.e. 3+6=9. The child can then use a pencil or other marker to apply the numeral 9 through the stencil 78, so that it will appear in a lower rectangular region 85 of the card 81, as seen in FIG. 8. FIG. 8 shows the card 81 after it has had the stencil applied.

If desired, the card can have on its reverse face a picture of a number of articles having the same number as the "answer" digit at upper right of the front panel 72 of the stencil case 60. In the example given, the card 81 could show 9 balloons on its reverse face.

Again in the embodiment shown in FIGS. 5–8, a colour matching confirmation can be arranged, to assure the user that he has inserted the correct card. To accomplish this, either the rectangular region 76 containing the numeral 9, or alternatively the entire front surface of the front panel 72 of the stencil case 60, can be of a particular colour, while all of the card 81 aside from the rectangular regions 82 and 85, can be of the same colour. This will mean that the colour showing through the further arrow-shaped window 74 in the front panel 72 of the stencil case 60 will match either the colour of the rectangular region 76 which lies rightwardly adjacent thereto, or will match the entire front surface of the front panel 72 of the stencil case 60. This will be true of all of the cards intended to be used with the particular stencil case 60 shown at FIG. 6. The remaining cards in that particular plurality would have different mathematical problems, for example 3×3, 5+4, 7+2, 11−2, etc.

A further feature can be included, relating to the production of sound. It is possible to provide, on the card 81 shown at FIG. 5, a magnetic tape portion 90 having a permanent magnetic record 92 that can be "read" by a suitable microprocessor unit which can be provided as a separate unit (not shown). The microprocessor would have, in addition to other possible functions, that of reading the magnetic message on the strip 90 as the card 81 is being inserted vertically downwardly into a suitable slot, and to produce a sound. The sound could, in this example, be a voice stating "three plus three equals nine". Each card would have a different "message" of this kind, depending upon the indicia in the region 82.

Figure 9:
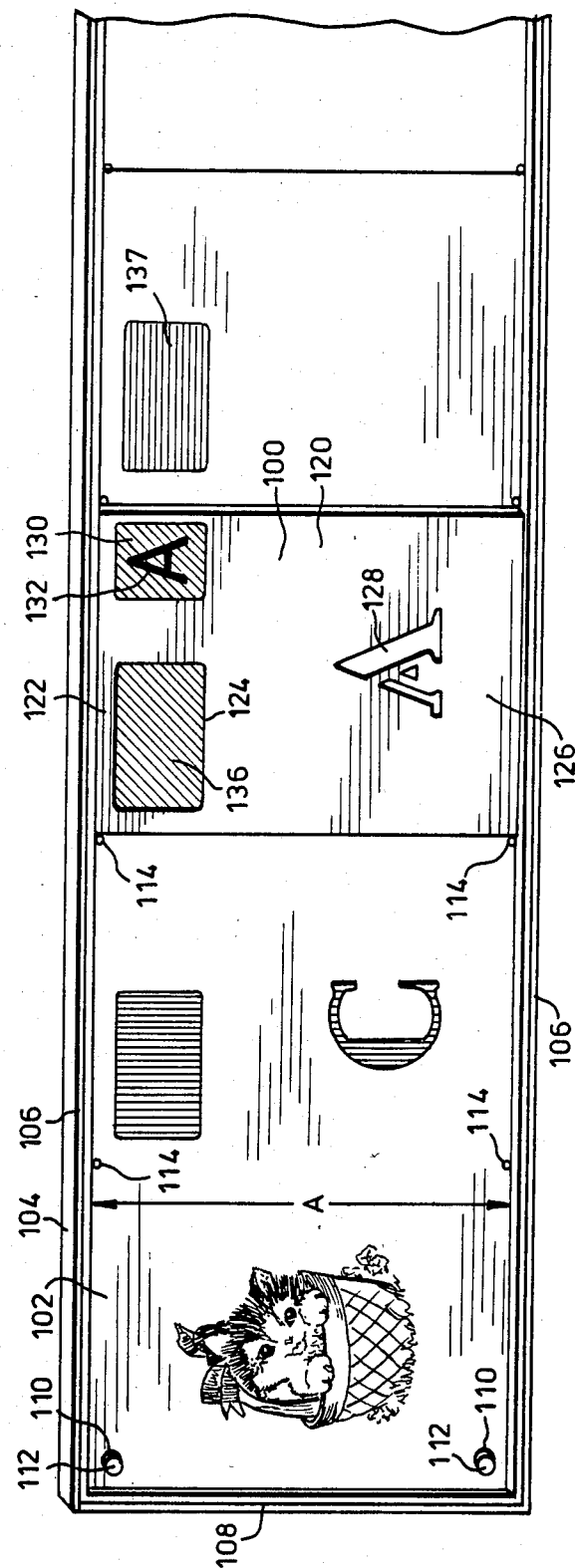
FIG. 9 is a perspective view of a third embodiment of this invention.

Attention is now directed to FIG. 9, which shows the third embodiment of this invention. The third embodiment of this invention involves, in combination, a stencil case 100, a plurality of cards such as the card 102 shown in FIG. 9 for use with the stencil case 100, and a holder 104 for the cards. The stencil case 100 is substantially rectangular. Each card 102 is also substantially rectangular and has a first dimension A substantially the same as a dimension of the stencil case 100, and a second dimension (in the direction perpendicular to A) which is substantially greater than the other dimension of the stencil case 100. The holder 104 is designed in such a way as to hold and retain a card 102, and more particularly defines raised side ribs 106 for enclosing a card 102 along the second dimension thereof. The holder 106 also has further side ribs of which one is seen at 108. Each card 102 has registration apertures 110, and the holder 104 has protuberances 112 adapted to be received through the apertures 110, thereby to hold the card 102 securely in place. Each of the side ribs 106 has inward projections 114 for locating a stencil case such as the case 100 shown in FIG. 9 in desired position, and also for gripping the card 102.

The stencil case 100 has a front panel 120 and is adapted to be placed such that the card 102 held in the holder 104 lies adjacently behind the front panel 120. The panel 120 has a first surface region 122 containing a window 124 through which the user can view the adjacently lying part of the card, a second surface region 126 containing a stencil 128, and a third surface region 130 bearing indicia 132 associated with the stencil 128 in the front panel 120.

It will be understood that, in order to allow the user to see the adjacently lying portion of the card 102 through the window 124, the stencil case 100 must be constructed in such a way that there is a window or opening in any back panel, so as not to obstruct the view through to the card. The same must also be true adjacent the region of the stencil 128, to allow the user to stencil through to the card 102. The preferred construction is one in which the stencil case 100 has two side walls extending rearwardly perpendicular to the front panel 120, so as to provide the necessary rigidity to the stencil case 100. It is not necessary to provide any form of back panel, since no slot needs to be defined in the embodiment shown in FIG. 9.

As can be seen in FIG. 9, the card 102 has a plurality of coloured areas 135, 136, 137, etc., spaced along the long dimension of the card, and the card further has a region adjacent each such coloured area for receiving a stencilled marking.

In the embodiment shown, the coloured region associated with any given letter would be the same. For example the coloured region for the letter C may be red, the coloured region for the letter A may be yellow, and the coloured region for the letter T may be blue. The user then selects, from a plurality of stencil cases 100, the one which has a colour in the region 130 that matches the leftward coloured region 135 in the card 102. Such stencil case will have the stencil for the capital letter C. The user then places the stencil case so that the coloured region 135 shows through the window 124, and applies the stencil for the capital letter C. Noting that the next coloured region in order is yellow, the user then selects the stencil case having yellow in the upper right region 130, places it so that the yellow coloured region 136 on the card 102 shows through the window 124, and stencils in the letter A. The same is done for the blue region 137 and the capital letter T.

Returning to FIG. 6, it will be seen that the case 60 has a hook formation 143 by means of which the case may be supported on a display board or the like.

It will be appreciated that a holder or box may be prepared to hold the stencils, cards and holders, containing different sizes of compartments wherein the various pluralities of cards and the different stencil cases may be retained.

It will further be possible for the cards to be formed with a suitable adhesive coating on the reverse face thereof. A release sheet could be provided to protect the adhesive until after the correct letter or number has been traced onto the card. At that point, the release sheet may be removed from the adhesive, and the card may be adhered to a suitable surface, such as a page in a book.

It is also envisaged that in order to make the educational toy more fun, the objects which are printed on the cards can be comic characters. The characters may have names such as "Ernie", and a card can then be filled in to read "E FOR ERNIE". The comic characters can be drawn from television programmes or from comic books.

It will be clear that the actual arrangement of the stencil and the positioning of the other various regions on the card and on the corresponding stencil case may be varied as required. Clearly, different combinations of letters and/or objects may be used and it is also envisaged that the rear side of the cards may be used to guide the child into selecting a correct card for a particular stencil. As explained previously, where the card has an arithmetic sum on one face thereof, the answer to that sum may be printed on the opposite side of the card in the form of a number of objects.

It would also be possible to arrange for the stencil to define only a part of the particular letter, number or object, so that after removal of a card from the stencil case, the letter, number or object will be completed freehand by the child. This will assist in developing writing and drawing skills in the child.

While three embodiments of this invention have been illustrated in the accompanying drawings and described hereinabove, it will be evident to those skilled in the art that changes and modifications may be made therein without departing from the essence of this invention, as set forth in the appended claims.

I claim:

1. In combination:
a stencil case and a plurality of cards for use with said stencil case,
the stencil case having a front panel and means for receiving a card such that the card lies adjacently behind said panel, the panel having a first surface region containing a window through which a user can view the adjacently lying part of a card, a second surface region containing a stencil, and a third surface region bearing indicia associated with that which is seen through said window when any one of said plurality of cards is received adjacently behind said panel,
each of said plurality of cards having a front face and a reverse face, the front face having a first region containing a picture or indicia that will be visible through said window when the card lies adjacently behind said front panel, and a second region for receiving a stencilled marking through the stencil of the front panel.

2. The combination claimed in claim 1, in which said front panel has a fourth region containing a further window through which the corresponding part of an adjacently lying card can be seen by the user, each of said plurality of cards having on its front face a third region containing a colour matching a coloured region on the front panel, said third region showing through said further window when the card is located adjacently behind the front panel, thereby to allow the user to be assured that he is using one of the correct cards for that stencil case.

3. The combination claimed in claim 2, in which the stencil case is rectangular and has a top edge, two side edges and a bottom edge, the first-mentioned window being located at upper left of the front panel, the further window being located at upper middle of the front panel, said third surface region being located at upper right of the front panel, and the stencil being located in the lower part of the front panel.

4. The combination claimed in claim 3, in which the indicia in said third region of the front panel is a number, and in which each card contains in said first region thereof a mathematical problem for which the answer is said number in the third region of the front panel.

5. The combination claimed in claim 4, in which the number is a number between 1 and 9, and in which each card has, on its reverse face, a picture showing a number of similar objects, the number of objects being the same as the number in the third region of the front panel.

6. The combination claimed in claim 4, in which each card has in said third region an 'equals' sign which shows through said further window when the card is received adjacently behind the front panel.

7. The combination claimed in claim 2, in which said coloured region on the front panel is incorporated in said third surface region.

8. The combination claimed in claim 2, in which said coloured region is the entire front surface of the front panel.

9. The combination claimed in claim 2, in which the stencil case is rectangular and has a top edge, two side edges and a bottom edge, the first-mentioned window being located in the lower part of the front panel, the stencil being located at upper left of the front panel, the further window being located at upper middle of the front panel, and said third surface region being located at upper right of the front panel.

10. The combination claimed in claim 9, in which the indicia in the third region of said front panel is a letter, and in which each card contains in said first region thereof a picture of an item of which the spelling of the name begins with the said letter.

11. The combination claimed in claim 10, in which each card has in said third region the word 'for' which shows through said further window when the card is received adjacently behind the front panel.

12. A non-computer teaching aid comprising a plurality of stencil cases as claimed in claim 2, each stencil case having a different colour in its said coloured region on the front panel thereof, and a plurality of pluralities of cards, each such plurality of cards having a common colour in said third region of the individual cards of the plurality.

13. The combination claimed in claim 1, in which said means for receiving a card comprises a slot adjacent a top edge of the stencil case, and rectilinear guide means for guiding a card inserted into said slot from the top into juxtaposition behind the front panel.

14. The combination claimed in claim 13, in which the stencil case is rectangular, said top edge being rectilinear, the case having two straight side edges perpendicular to said top edge and a straight bottom edge perpendicular to the side edges, said guide means comprising narrow side walls extending rearwardly from said side edges, and flange means extending inwardly from the side walls spaced from said front panel.

15. The combination claimed in claim 14, in which said flange means is part of a rear panel of the stencil case.

16. The combination claimed in claim 15, in which the rear panel has a removed region adjacent said stencil.

17. The combination claimed in claim 1, in which each card has an encoded magnetic strip along one edge, the combination further including electronic means for reading the magnetic strip as a card is inserted into a slot of the electronic means, and for producing a combination of sounds in accordance with the information encoded into the strip.

18. The combination claimed in claim 17, in which said combination of sounds resembles a voice making a statement relating to the picture or indicia in the first region of the respective card.

19. In combination:
a stencil case, a plurality of cards for use with said stencil case and a holder for the cards, the stencil case being substantially rectangular, each card being substantially rectangular with a first dimension substantially the same as a dimension of the stencil case and a second dimension substantially greater than the other dimension of the stencil case,
the holder being adapted to hold and retain a card, the stencil case having a front panel and being adapted to be placed such that a card held in said holder lies adjacently behind the front panel, the panel having a first surface region containing a window through which a user can view the adjacently lying part of a card, a second surface region containing a stencil, and a third surface region bearing indicia associated with the stencil in the front panel,
each of said plurality of cards having a plurality of coloured areas spaced along said second dimension of the card, and having a region adjacent each such coloured area for receiving a stencilled marking.

20. The combination claimed in claim 19, in which the stencils are letters of the alphabet, in which each said coloured region on a given card is colour coded to a particular letter, in which the card contains a picture of an item intended to be spelled by the user employing the stencils, and in which each stencil case has on the front panel a coloured region coded to the stencil letter in the same way as occurs in the cards.

21. The combination claimed in claim 20, in which the coloured region of the front panel is said third surface region bearing indicia.

22. The combination claimed in claim 20, in which the entire front panel constitutes said coloured region.

23. The combination claimed in claim 19, in which each card has registration apertures and the holder has protuberances adapted to be received through said apertures, thereby to hold the card securely in place.

24. The combination claimed in claim 23, in which the holder further has raised side ribs for enclosing a card along said second dimension thereof, there being two said protuberances located one each adjacent an end of the side ribs.

25. The combination claimed in claim 24, in which each side rib has inward projections for locating a stencil case in desired position and for gripping a card.

* * * * *